United States Patent Office 2,927,004
Patented Mar. 1, 1960

2,927,004

PREPARATION OF PURE SILICON OR GERMANIUM FROM THEIR ALKYLS

Peter R. Girardot, Middleton, Wis., assignor to Bjorksten Research Laboratories, Inc., Madison, Wis., a corporation of Illinois No Drawing. Application May 31, 1955
Serial No. 512,313

5 Claims. (Cl. 23—223.5)

This invention relates to a process for the preparation of a transistor metal of a purity heretofore not achieved by chemical means. With a transistor metal I understand a metal having the electron-hole structure rendering it suitable for transistor applications such as for example silicon and germanium.

An object of the present invention is to provide a process whereby pure silicon metal is prepared from silicon tetrahalides formed by well known means from siliceous ores. Another object is to provide silicon of a purity heretofore unobtained by simple chemical means. Another object is to provide silicon completely free from boron. Another object is to prepare silicon of a purity sufficiently high to permit the manufacture of transistors. A more specific object of the invention is to provide a process whereby silicon tetrahalides contaminated with halides of other elements such as phosphorus, boron, titanium, etc. are converted to alkyls, then by taking advantage of the more markedly different properties of the alkyls, achieving a high degree of purification of silicon tetralkyl, then reducing the silicon tetralkyl by a simple means to highly pure silicon metal. Other objects and advantages of the invention will hereinafter appear.

Previously, purifications of silicon metal to a high degree of purity have been effected by physical means such as the so-called moving zone purification, wherein a molten zone is moved gradually down the length of a rod or cylinder of impure silicon metal, resulting in purification due to the preferential solubility of impurities in the molten zone. Another physical method of preparation which is similar to the moving zone method is the "cage zone" method, wherein a melted zone is moved gradually down the length of an oval, hexagonal or square rod of impure silicon. In the latter method no crucible or support for the metal is required since the edges of the non-cylindrical shape, having a greater rate of heat loss, tend to remain solid as a cage for the molten material. The molten zone again sweeps impurities with it to the end of the bar. In both of the above processes, however, the method is severely limited in that only small quantities may be processed at a given time, accompanied by a high rate of current consumption.

Other physical methods for purification of silicon involve low temperature distillation of impurities from liquids or liquified gases, e.g., silicon tetrahalides, etc., in order to distill impurities from the silicon tetrahalide before it is reduced to silicon metal. Disadvantages of this process are expensive equipment required for low temperature distillation, insufficient degree of separation of impurities from the silicon tetrahalide, and difficulty of operation on a commercial scale.

I avoid these difficulties by a chemical process of purification. This process relies on large differences in reactivity of alkyl compounds of silicon and of its impurity elements. For example, some of the most objectionable impurities in silicon metal to be used for transistors are boron and phosphorus. My process utilizes the extreme stability of silicon tetralkyls as compared to the alkyls of boron, phosphorus and other like impurities, especially of groups III and V of the periodic table. I effectively remove these to a level low enough to permit the silicon resulting from the decomposition of the silicon tetraalkyls to be used for transistors.

In general my process is effected in the following manner; a metal alkyl is added to a solution of impure silicon tetrahalide, the resulting silicon tetralkyl (contaminated with other non-metal alkyls and metal alkyls) is washed or extracted with such materials as concentrated sulfuric acid, concentrated alkalies, alcoholic HCl, water, carbon disulfide and other inexpensive materials of commerce with which the alkyl derivatives of the impurities are reactive, and the alkyl derivatives of silicon are not. The alkyl derivatives of impurity elements are hydrolyzed or converted to solid complexes from which the silicon alkyls can readily be removed. Simple heating of the silicon alkyls under the proper conditions then leads to preparation of a highly pure, white, crystalline silicon metal.

The halides or the silicon alkyl may be purified by distillation, though generally this is not necessary.

With the advent of the use of active metals such as sodium and lithium and their alkyl derivatives as large scale intermediates in commerce, it is now feasible to use the present process for the purification of silicon, whereas in the past the unavailability of the active metals and of their alkyl derivatives made such a process impractical.

The advantages of my process are that it does not require techniques or equipment which are inconvenient or difficult in use. For example, sodium dispersions are now prepared in large scale for the preparation of organosodium compounds as intermediates. The scrubbing or washing of gases and liquids which in the case of my process removes impurities, is well known to commerce. The pyrolysis or cracking of vapors such as here employed for the preparation of silicon from silicon tetralkyls is well known in the petroleum industry. The handling of reactive metal such as titanium, zirconium, silicon, etc., once they are prepared from volatile compounds, is also common in industry today. Accordingly in the first step of my process I prepare silicon tetralkyls by either a one or two-step method. In the two-step method, a sodium or lithium dispersion in an inert medium such as benzene, toluene, pentane, petroleum ether, or the like, is allowed to react with an alkyl halide, thereby forming sodium halide and a solution of sodium alkyl. The sodium halide is readily filtered from the mixture leaving a solution of sodium alkyl in the dispersing medium. At the same time excess dispersed sodium may be removed by filtration. The solution of sodium alkyl is then allowed to react with a solution of silicon tetrahalide, such as $SiCl_4$, giving sodium chloride and silicon tetralkyl. It has been found (Morton and Richardson, J. Am. Chem. Soc., 62, 123 (1940)) that the yields of sodium alkyl increase as the length of the alkyl chain increases, up to amyl. The yield of amyl sodium is 95% when excess sodium is used, and when sodium is activated with amyl alcohol before use. Thus in this step a sodium dispersion in benzene is reacted with amyl chloride to give sodium chloride and sodium amyl. After filtering excess sodium metal and sodium chloride, the solution of sodium amyl is allowed to react with a solution of silicon tetrachloride in benzene. The products are sodium chloride as a solid precipitate and silicon tetramyl, an oil soluble in organic solvents.

Alternatively, this step of the process may be carried out with both reactions occurring simultaneously. For example, if a sodium dispersion is mixed with a solution of amylchloride and silicon tetrachloride in benzene, and allowed to react the products will be sodium chloride and silicon tetramyl. Again the sodium chloride and excess sodium are filtered from the mixture leaving a solution of silicon tetramyl in benzene.

Other active metals than sodium may be used, for example, lithium. Using lithium butyl and silicon tetrachloride in ethyl ether, the yield of silicon tetrabutyl was found to be 98% (Gilman, J. Am. Chem. Soc. 68, 1675 (1946)). Other solvents may be used than benzene, for example, pentane, petroleum ether, toluene, etc., either as dispersant and/or as solvents. The method is not limited by the solvent or dispersant used, and mixed solvents may also be used. In all of the reactions heretofore run for the preparation of silicon tetralkyls, massive active metals or fine sands of the metals have been used. If instead active metal dispersions are used, it is customarily observed that yield and ease of reaction both increase.

Having prepared the alkyl derivatives of silicon and its impurities, solvent is removed by distillation, and the second or purification step of the process is carried out. In this, the product is washed or extracted with concentrated acid such as concentrated sulfuric acid or with alcoholic hydrochloric acid or the like to remove silicones and impurities such as boron trialkyls. Any titanium compounds would also be removed in this step. The product is then washed with water and dried. Boron, which is a most objectionable impurity in silicon to be used for transistors, is easily and effectively removed from the mixture of alkyls in this step by virtue of its ease of reactivity toward hydrolysis under there conditions. Here, in this simple and novel step, one of the greatest blocks to a high degree of purification of silicon is overcome.

Silicon tetralkyls are so stable toward hydrolysis that they have been heated under pressure with water for many hours and have been unchanged. They can be distilled from a mixture with hot concentrated sulfuric acid or from alkalis. Such an acid or alkali distillation on scrubbing will effectively remove every trace of boron or phosphorus alkyls and for most purposes simple bubbling or moving countercurrently in a packed tower, will suffice.

A subsequent extraction with carbon disulfide results in the formation of the solid phosphorus trialkyl-carbon disulfide complexes which are solids, relatively stable, and easily removed from the remaining silicon tetralkyl liquids. Alternative methods of removal of phosphorus alkyls are extraction with an HCl solution of cuprous chloride, forming a complex. Again, an extraction with amyl alcohol will give tetramyl phosphonium hydroxide, a strong base, of strength comparable to tetralkyl ammonium hydroxides. Thus phosphorus impurities are readily removed in a second extraction process.

The phosphorus triamyl-carbon disulfide complex, for example, is a red solid melting at 55°. (David, Pearse, and Jones, J. Chem. Soc., 1929, 1262.)

In the final step of my process the now highly purified and highly stable silicon tetralkyl is thermally decomposed to silicon metal and hydrocarbons. Decomposition temperatures of silicon tetralkyls decrease as the length of the carbon chain increases. At the same time the activation energies necessary for the decomposition decrease as the length of the carbon chains increases. Silicon tetramethyl, for example, decomposes at 659–717° C. and has an activation energy of 79,000 calories. Silicon tetraethyl decomposes at 586° and has an activation energy of 50,500 calories. Silicon tetrapropyl decomposes at 560° and has an activation energy 46,000 calories. Thus if silicon tetramyl is used, its activation energy and decomposition temperature are still lower resulting in savings in cost of the overall process. The lowering of activation energy with increasing chain length is attributed to the negative effect of added $CH_3$ groups, which tend to weaken the silicon-carbon bond. (Waring, Trans. Faraday Soc., 235, 1142 (1940).)

It has been shown that the thermal decomposition of silicon tetralkyls is a two-step process. In the first step the silicon tetralkyl decomposes to silicon metal and gaseous hydrocarbons. In the second step, the gaseous hydrocarbons interact among themselves to give elemental carbon, alkenes, etc., as well as other fragments. It is undesirable to deposit elemental carbon at the same time as the elemental silicon is formed, in order to avoid contamination of the silicon with silicon carbide. This step may be avoided, however, by proper control of the temperature of decomposition, and especially by admixing with the vapors of silicon tetralkyl before decomposition one or more compounds for inhibiting carbon deposition, such as NO, an oxide of nitrogen, which inhibits the second step or formation of carbon deposits.

The method thus would involve, for example, the heating of silicon tetramyl which boils at 318° C., to about 400° in the vapor stage. After admixture of NO with this gaseous silicon tetralkyl, the mixture is led through a heated tube where it thermally decomposes to silicon and gaseous hydrocarbons. The silicon metal may be continually removed by a blade scraping the internal surface of the cylinder. The continual removal is advantageous, since deposition of metallic silicon from silicon tetralkyls takes place preferentially at a clean wall. Pyrolysis takes place in a matter of minutes, and the gases are then led through a condenser where unconverted silicon tetralkyl is condensed and recycled. The off-coming gases, hydrocarbons, may be burned as fuel for the pyrolysis of the silicon tetralkyls to silicon.

The entire process may be applied to germanium purification as well.

I shall now illustrate by way of examples, methods of preparing highly pure silicon from silicon tetralkyls, and of pure germanium from germanium alkyls, but it will be distinctly understood that the invention will not be limited specifically to the details of the examples.

*Example 1*

Forty milliliters of amyl chloride and eighty milliliters of benzene is placed in a one liter flask. Sixty grams of sodium dispersed in 150 milliliters of a mixture of benzene and petroleum ether, four to one by weight, such that the particle size is very fine, for example between two and twenty microns, is added to the flask under dry nitrogen with vigorous stirring at zero degree C. for one hour. The reaction mixture is filtered under nitrogen or other inert atmosphere and to it is added twelve grams of silicon tetrachloride, $SiCl_4$ in 100 milliliters of benzene. The mixture is heated to reflux for one hour, then filtered. The solvent is evaporated and the product washed with 70% sulfuric acid, then with water, then dried with calcium chloride. The product is washed with carbon disulfide, filtered and the carbon disulfide distilled off.

The silicon tetramyl, $Si(C_5H_{11})_4$, is distilled and the vapor, after admixing with it from one to five percent of NO, is led into a quartz tube heated to 550° C. The tube is three feet long, and the vapors as they slowly pass through it deposit metallic silicon on the walls of the tube. After completion of the pyrolysis, the tube is filled with an inert gas, and the silicon metal scraped out, an inert atmosphere being maintained. Spectroscopic analysis of the metal shows it to be of transistor grade.

*Example 2*

To a one milliliter flask are added ten grams of butyl chloride dissolved in 100 milliliters of ether, fifteen grams of lithium metal dispersed in four hundred milliliters of toluene such that the average particle size is ten microns, and 4.0 grams of silicon tetrachloride in 100 milliliters of toluene. The mixture is heated to reflux for one hour, then cooled and filtered. The ether and toluene are distilled off, and the tetrabutyl silane washed with 50% sulfuric acid, then with water, then with an 0.5 molar solution of cuprous chloride in 20% hydrochloric acid.

The two phase mixture is filtered, the layers separated, and the tetrabutyl silane, now purified, is dried and distilled. The vapors, instead of being condensed, are mixed with a stream of inert gas by means of which they are carried into a pyrolysis tube maintained at 550° C. Pure silicon deposits on the wall of the quartz pyrolysis tube and is subsequently removed under an inert atmosphere by scraping. The product is essentially free of boron, phosphorus, and other impurities detrimental to silicon used for transistors.

*Example 3*

To a two liter flask are added a solution of fifty grams of amyl chloride in 300 milliliters of benzene, one hundred fifteen grams of fine sodium sand in 300 milliliters of benzene, and one hundred grams of germanium tetrachloride in 400 milliliters of benzene. The mixture is heated to reflux for two hours, cooled and filtered. Benzene is distilled off and the product washed with 50% sulfuric acid and then with water, then dried. The product is washed with carbon disulfide, filtered, and the carbon disulfide distilled off. Purified germanium tetraamyl is then distilled, the vapors mixed with 1% NO and led into a pyrolysis chamber where decomposition to pure metallic germanium takes place at the heated walls. The resulting pure germanium is scraped off under an inert atmosphere, and then collected.

If desired, other silicon or germanium halides than the chlorides may be used, although the chloride is most desirable. Other alkyl halides than those mentioned in the examples may be used, although yields are greatest with the longer chain length alkyl groups, and pyrolysis is most efficient in these cases. For example I may use butyl bromide, isobutyl chloride, propyl iodide, hexyl chloride and the like. Other active metals than sodium or lithium may be used without departing from the scope of the invention, for example potassium, magnesium, calcium, and the like. From a consideration of the above specifications it will be appreciated that many changes may be made in the details therein given without departing from the invention or sacrificing any of its important advantages. Therefore it is my intention to cover the invention in the following claims as broadly as possible in view of prior art.

Having thus disclosed my invention, I claim:

1. The process for preparing a material selected from the group consisting of silicon and germanium which comprises reacting a tetrahalide of said material with an alkyl of an alkali metal thereby forming a tetralkyl of said material, purifying said tetralkyl of said material by washing it with an inorganic acid, water, and carbon disulfide, filtering, distilling and then thermally decomposing said tetralkyl of said material to metallic material.

2. The process for preparing silicon, which comprises reacting a silicon tetrahalide with an alkyl of an alkali metal thereby forming silicon tetralkyl, purifying the silicon tetralkyl by washing it with an inorganic acid, water, and carbon disulfide, filtering, distilling and then thermally decomposing the silicon tetralkyl to metallic silicon.

3. The process for preparing germanium, which comprises reacting a germanium tetrahalide with an alkyl of an alkali metal thereby forming germanium tetralkyl, purifying the germanium tetralkyl by washing it with an inorganic acid, water, and carbon disulfide, filtering, distilling and then thermally decomposing the germanium tetralkyl to metallic germanium.

4. The process for preparing silicon, which comprises reacting a silicon tetrahalide with an amyl of an alkali metal thereby forming silicon tetramyl, purifying the silicon tetramyl by washing it with an inorganic acid, water, and carbon disulfide, filtering, distilling and then thermally decomposing the silicon tetramyl to metallic silicon.

5. The process for preparing germanium, which comprises reacting a germanium tetrahalide with an amyl of an alkali metal thereby forming germanium tetramyl, purifying the germanium tetramyl by washing it with an inorganic acid, water and carbon disulfide, filtering, distilling and then thermally decomposing the germanium tetramyl to metallic germanium.

References Cited in the file of this patent

UNITED STATES PATENTS

| 2,238,669 | Wiley | Apr. 15, 1941 |
| 2,386,452 | Fleming | Oct. 9, 1945 |

OTHER REFERENCES

Waring: Faraday Society Transactions, vol. 36 (1940), pages 1142, 1146–1148.